US008307873B2

(12) United States Patent
Klabunde et al.

(10) Patent No.: US 8,307,873 B2
(45) Date of Patent: Nov. 13, 2012

(54) DEVICE FOR CUTTING THROUGH THE ADHESIVE BEAD OF PANES FIXED BY BONDING

(75) Inventors: Olaf Klabunde, Giengen (DE); Joachim Clabunde, Heubach (DE); Juergen Blickle, Goeppingen (DE); Bernd Mayer, Ellwangen (DE)

(73) Assignee: C. & E. Fein GmbH (DE)

( * ) Notice: Subject to any disclaimer, the term of this patent is extended or adjusted under 35 U.S.C. 154(b) by 310 days.

(21) Appl. No.: 12/628,660

(22) Filed: Dec. 1, 2009

(65) Prior Publication Data

US 2010/0132201 A1 Jun. 3, 2010

(30) Foreign Application Priority Data

Dec. 1, 2008 (DE) ........................ 10 2008 060 802

(51) Int. Cl.
*B32B 38/10* (2006.01)

(52) U.S. Cl. ........ 156/762; 156/717; 156/927; 156/939; 83/651.1

(58) Field of Classification Search .................. 156/717, 156/762, 927, 939; 83/307.1, 651.1
See application file for complete search history.

(56) References Cited

U.S. PATENT DOCUMENTS

| | | | | |
|---|---|---|---|---|
| 4,215,475 | A | 8/1980 | Morford et al. | |
| 4,227,517 | A * | 10/1980 | Aguiar | 602/9 |
| 4,601,224 | A * | 7/1986 | Clark, III | 83/74 |
| 5,622,093 | A * | 4/1997 | Hutchins | 83/13 |
| 6,616,800 | B2 * | 9/2003 | Eriksson | 156/714 |
| 7,841,271 | B2 * | 11/2010 | Sipma et al. | 99/461 |
| 8,205,534 | B2 * | 6/2012 | Yazawa et al. | 83/651.1 |
| 2002/0121330 | A1 | 9/2002 | Eriksson | |
| 2006/0117573 | A1 * | 6/2006 | Jensen et al. | 30/286 |
| 2007/0000361 | A1 * | 1/2007 | Ericson | 83/13 |
| 2007/0040415 | A1 | 2/2007 | Ericson | |
| 2007/0214649 | A1 | 9/2007 | Hess | |
| 2008/0012349 | A1 | 1/2008 | Finck | |
| 2009/0283214 | A1 * | 11/2009 | Nelson | 156/344 |
| 2010/0132882 | A1 * | 6/2010 | Hess et al. | 156/250 |

FOREIGN PATENT DOCUMENTS

| | | | |
|---|---|---|---|
| DE | 4019933 | A1 | 1/1992 |
| DE | 29711291 | U1 | 9/1997 |
| DE | 102006013417 | A1 | 9/2007 |
| GB | 2308823 | A | 7/1997 |
| WO | 8607017 | A1 | 12/1986 |
| WO | 2004014678 | A2 | 2/2004 |
| WO | 2004103748 | A1 | 12/2004 |

* cited by examiner

*Primary Examiner* — Mark A Osele
(74) *Attorney, Agent, or Firm* — St. Onge Steward Johnston & Reens LLC

(57) ABSTRACT

The invention discloses a device for cutting through an adhesive bead of a vehicle pane, in particular a windshield, having a motor-driven winding-up device that comprises a coil for winding up a cutting wire in a working direction for cutting through the adhesive bead, the winding-up device being provided with a strain relief for the cutting wire which allows the cutting wire to be withdrawn from the winding-up device in a sense opposite to the working direction.

17 Claims, 3 Drawing Sheets

DEVICE FOR CUTTING THROUGH THE ADHESIVE BEAD OF PANES FIXED BY BONDING

BACKGROUND OF THE INVENTION

The present invention relates to a device for cutting through an adhesive bead of a pane, in particular a vehicle pane, having a motor-driven winding-up device that comprises a coil for winding up a cutting means in working direction for cutting through the adhesive bead.

A device of the before-mentioned kind has been known from DE 10 2006 013 417 A1.

Although the device according to the invention will be described hereafter in more detail with reference to an embodiment that relates to cutting out a windshield, it is understood that this description is not meant to limit the invention and that instead the device can be generally used for cutting out any pane that had been fixed by bonding, for example in motor vehicles, buildings, railway trains, cableway cabins, aircraft and ships.

Windshields of modern vehicles are firmly connected with a circumferential body flange by an adhesive bead consisting of a polyurethane adhesive or another suitable adhesive. The adhesive bead consists of a material so strong that the adhesive, together with the windshield, increase the mechanical stability of the vehicle. It is understood that due to the high strength and toughness of the adhesive cutting through the adhesive is a relative difficult task.

However, as windshields have to be exchanged relatively frequently, due to rockfall or other damage, there must be available for every vehicle type a suitable device and/or a suitable method by which the windshield can be removed.

In the case of the before-mentioned device, the winding-up device is supported on the body flange using a support while the winding-up device is driven to progressively cut through the adhesive bead. During that process, the winding-up device and the support are moved along the body flange in accordance with the progress of the cutting operation.

A device of that kind is normally driven by a universal motor, in combination with a reduction gear, to guarantee application of the required pull on the cutting means and a slow winding-up speed. As the winding-up device is supported on the body flange the cutting-through operation normally has to be interrupted several times and the operation can be continued only after transfer of the winding-up device to a different position. It is sometimes even necessary for that purpose to withdraw the cutting means from the winding-up device, in a sense opposite to the working direction. And due to the reduction gear normally used, this requires that considerable forces have to be applied.

SUMMARY OF THE INVENTION

It is a first object of the present invention to disclose a device for cutting through the adhesive bead of a pane that makes that operation as energy-saving and easy as possible.

It is a second object of the invention to disclose a device for cutting through the adhesive bead of a pane that simplifies the operation for a worker.

It is a third object of the invention to disclose a method of cutting through an adhesive bead of a pane that allows for a simple and time-saving cutting operation.

According to the invention, these and other objects are achieved by a device of the kind described above, wherein the winding-up device is provided with a strain relief device for the cutting means which allows the cutting means to be withdrawn from the winding-up device in a sense opposite to the working direction.

The object of the invention is thus perfectly achieved.

This is so because the strain relief device guarantees that withdrawing the cutting means from the winding-up device in a sense opposite to the working direction is rendered possible when the winding-up operation in working direction is interrupted. So, energy-saving working is rendered possible in the event the cutting means has to be withdrawn from the winding-up device in a sense opposite to the working direction.

In the context of the present application the term "cutting means" is to be understood to mean every type of wire or cord basically suited for cutting through an adhesive bead of a vehicle pane. This means that a cutting means must have sufficient tear strength and flexibility, and must under certain circumstances be provided with a suitable coating or suitable surface features in the form of a toothing or the like to support the cutting operation. However, it is understood that the term "cutting means" also includes a cord made from a plastic material or any other material.

According to a further development of the invention, the winding-up device comprises a drive that can be reversed between clockwise and counter-clockwise rotation for relieving the strain that acts on the cutting means.

This ensures that the cutting means can be actively unwound from the winding-up device if that should become necessary.

While a purely automatic reversal of the sense of rotation is connected with a risk that the cutting means may accumulate within the coil and may cause jamming of the coil, providing a mechanical overrun clutch between the drive and the coil guarantees that unwinding of the cutting means will be possible only when a strain is effectively applied on the cutting means.

According to an alternative embodiment of the invention, the drive is coupled with a control comprising a switch for switching on the drive, which is designed in a manner such that after having been switched off the drive will be rotated for a certain time in a sense opposite to the working direction.

In the switched-off condition of the drive, the coil therefore automatically rotates in a sense opposite to the working direction for a limited period of time. The user is then in a position to withdraw the winding-up device without having to apply too much force.

According to an advantageous further development of that embodiment, the design of the control is such that the drive will coil back the cutting means to its original condition when no pull is exerted upon the cutting means after the drive has been switched off.

This prevents any unnecessary unwinding and jamming of the cutting means in the coil.

According to a further embodiment of the invention, the drive is coupled with a control provided with a switch adapted to switch on the drive, which is designed in such a way that after the drive has been switched off the cutting means is unwound when a pull is exerted upon the cutting means.

This offers the user an especially comfortable way of withdrawing the cutting means. When no pull is exerted upon the cutting means no unwinding occurs so that any inadvertent wrong operation is avoided and jamming of the cutting means in the coil is safely prevented.

According to another embodiment of the invention, the design of the control in this case is such that the unwinding speed of the cutting means will rise as the pull exerted upon the cutting means increases.

This improves the comfort for the user still further.

According to another embodiment of the invention, the unwinding operation is ended when no further pull is exerted upon the cutting means.

This helps facilitate the operation still further.

According to an additional further development of the invention, there is provided a signaling means that signals any activation of the strain relief device.

The user is thus permitted to recognize that the cutting means is being unwound from the coil, and is thereby allowed to coordinate his/her movements with the winding-up device in a suitable way. The signaling means may be some optical and/or acoustic means. Or the winding-up device may, for example, be set in vibration to signal to a user the respective operating mode.

According to a still further embodiment of the invention, the drive comprises an overload protection actuation of which is indicated by a signaling means.

This on the one hand prevents any damage to the winding-up device. On the other hand, the user is warned that the overload protection responds so that he/she can take any necessary remedial measures. For example, the cutting means may be jammed between the body flange and the vehicle pane or in the coil. The signaling means may be the same signaling means that has been mentioned before, or else a different signaling means that permits the user to distinguish activation of the overload protection from activation of the strain relief device. For example, different acoustic and/or optical signals may be used in that case.

The overload protection may, for example, comprise a clutch that can be activated mechanically. Any overloading of the drive is thus prevented in a simple and reliable way.

According to another embodiment of the invention, the winding-up device comprises a drive coupled with the coil and further a handle on a first end, with a removable support disposed on a second end, opposite to the handle, for guiding the winding-up device on a frame to which the vehicle pane is bonded, or on the adhesive bead as such.

Further, an accelerator switch operable by a push-button, which is coupled with the control for controlling the winding-up speed, is provided, preferably on the handle.

This ensures easy and comfortable operation.

According to a further embodiment of the invention, the winding-up device comprises a housing that widens approximately in the form of a wedge from the support toward the handle.

That feature helps to ensure that the support of the winding-up device can be applied to the body flange even under geometrically unfavorable conditions because any bigger parts of the winding-up device are in that case arranged at a greater distance away from the support.

In the event application of the tool to the frame or to the adhesive bead should still be impossible under the particular geometric conditions, then the support can be exchanged against another, better suited support.

It is understood that an especially well-suited support may also be provided separately for every vehicle type.

Further, it is understood that the features of the invention mentioned above and those yet to be explained below can be used not only in the respective combination indicated, but also in other combinations or in isolation, without leaving the scope of the invention.

BRIEF DESCRIPTION OF THE DRAWINGS

Further features and advantages of the invention will become apparent from the description that follows of certain preferred embodiments, with reference to the drawing. In the drawing

DETAILED DESCRIPTION OF THE PREFERRED EMBODIMENTS

Figure 1:
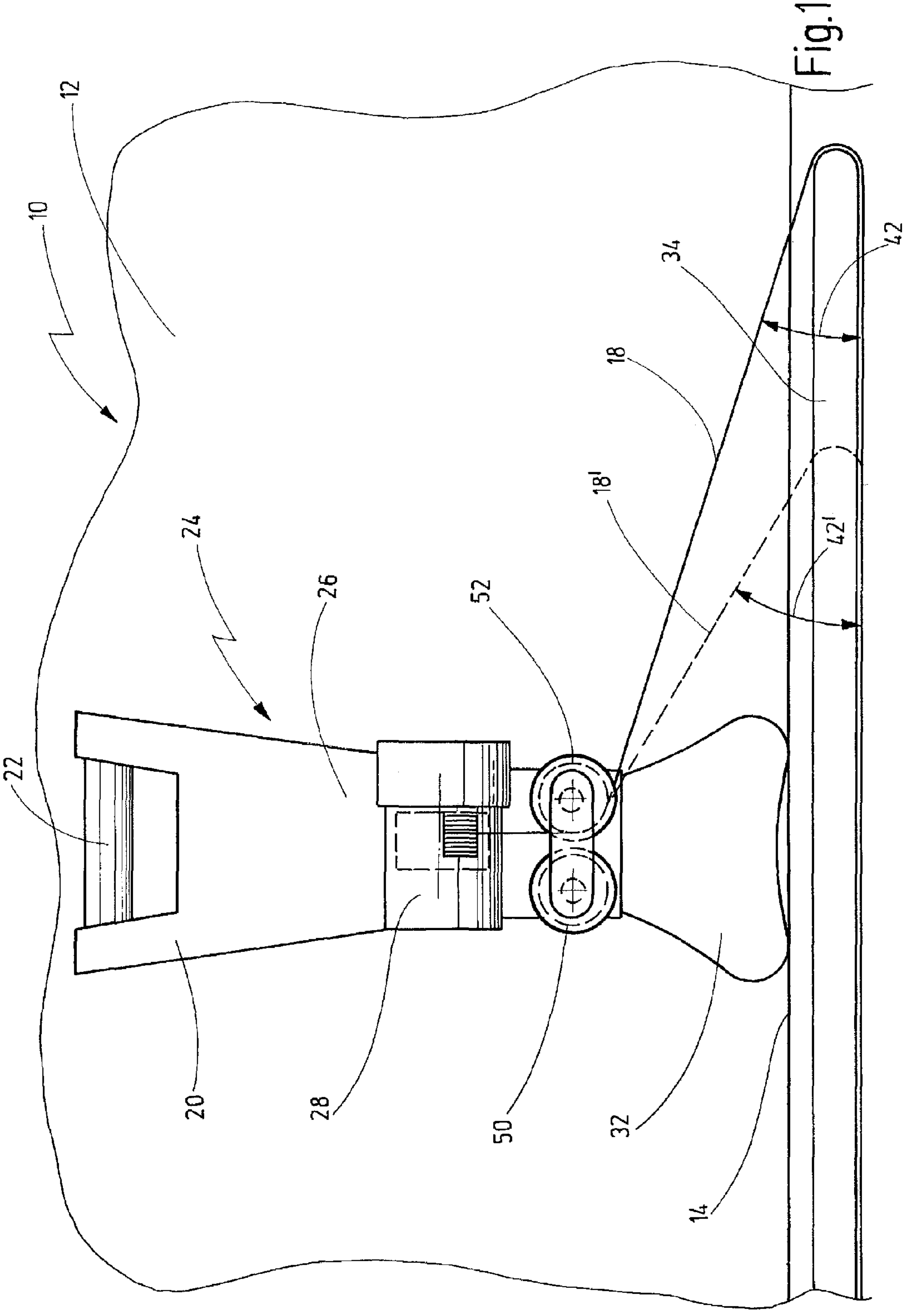
FIG. 1 shows a greatly simplified representation of a vehicle pane with a motor-driven winding-up device according to the invention adapted to wind up the cutting means, the device being guided along a body flange that is connected with the vehicle pane by an adhesive bead.

In FIG. 1, a device according to the invention is indicated generally by reference numeral 10.

The device 10 comprises a winding-up device 24 adapted to wind up a cutting means 18 that serves to cut through an adhesive bead 34 of a vehicle pane 12.

The vehicle pane 12 may, for example, be a windshield of a motor vehicle which is bonded onto a body flange 14 using an adhesive bead 34 that consists of a very tough plastic material, such as a polyurethane adhesive. The adhesive bead 34 is extremely strong thereby contributing to the stability of the vehicle.

When an adhesive bead 34 of that kind is to be cut through using a cutting means 18 in the form of a wire or the like, then obviously considerable forces are required for that operation.

Figure 3:
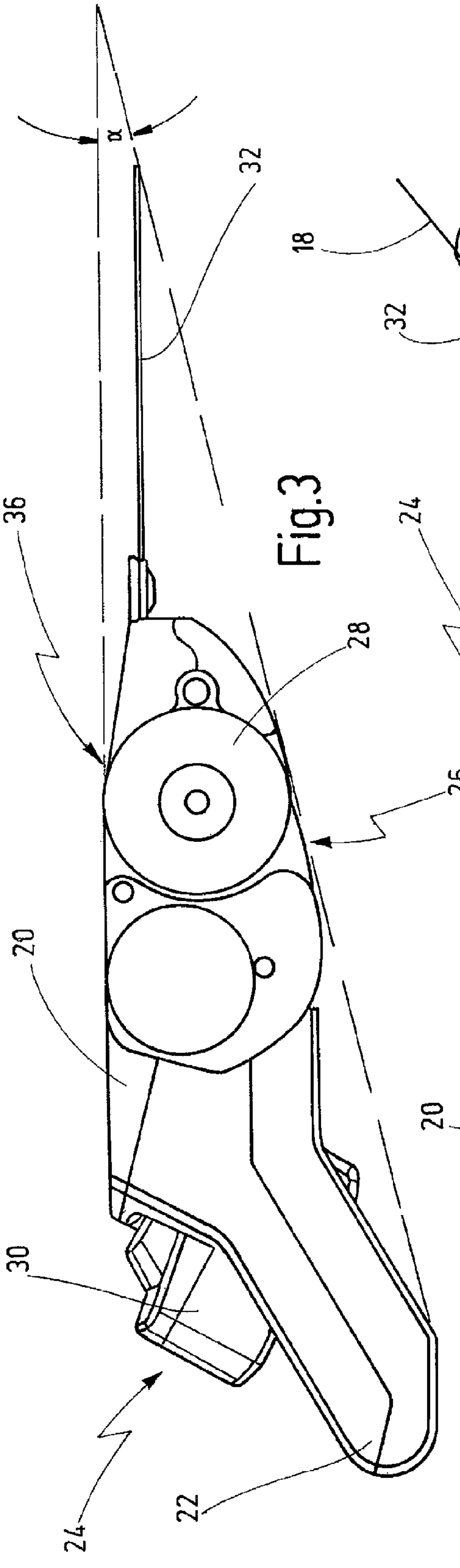
FIG. 3 shows a side view of the winding-up device according to FIG. 2.

The winding-up device 24 comprises a housing 20 with a handle 22 provided on its one end. As can be seen in FIG. 3, the housing 20 tapers like a wedge from the handle 22 toward the opposite end on which a support 32 is mounted in a detachable way. The cutting means 18 can be wound up on, or unwound from, a coil 28 by means of an electric drive 26. For the purpose of guiding the cutting means 18 to the coil 28 two guide rolls 50, 52 are provided on the support 32, ensuring that the cutting means 18 will be wound up on the coil in a substantially tangential fashion.

For separating a vehicle pane 12, for example a windshield, from a vehicle the cutting means 18 is at first threaded fully around the adhesive bead 34 from the outside. Thereafter, a first end is fastened either from the outside on a stationary part of the vehicle, for example on the wiper shaft, or else on the pane as such, from the outside or the inside, using a suction plate, for which purpose it must first be threaded through the adhesive bead 34. The second end of the cutting means 18 is then passed through the adhesive bead 34 and is fastened on the winding-up device 24. Now, the winding-up device 24, together with its support 32, is applied against the frame or the body flange 14 and the drive of the winding-up device 26 is actuated. This causes the cutting means 18 to be progressively pulled through the adhesive bead 34 so that the latter is cut through. The angle 42 between the cutting means 18 and the body flange 14 should be as small as possible to achieve a satisfactory cutting effect. The winding-up device 24, with its support 32, is then progressively guided along the frame 14, in accordance with the progress of the cutting operation, so that the angle between the cutting means and the body flange 14 does not widen excessively, as is indicated by the position of the cutting means 18' indicated by broken lines in FIG. 1 and by the angle 42'. It is, however, also imaginable to guide the support 32 along the adhesive bead 34.

Hereafter, the structure of the winding-up device 24, which has been shown in a purely diagrammatic way in FIG. 1, will be described in more detail with reference to FIGS. 2 to 4.

Figure 2:
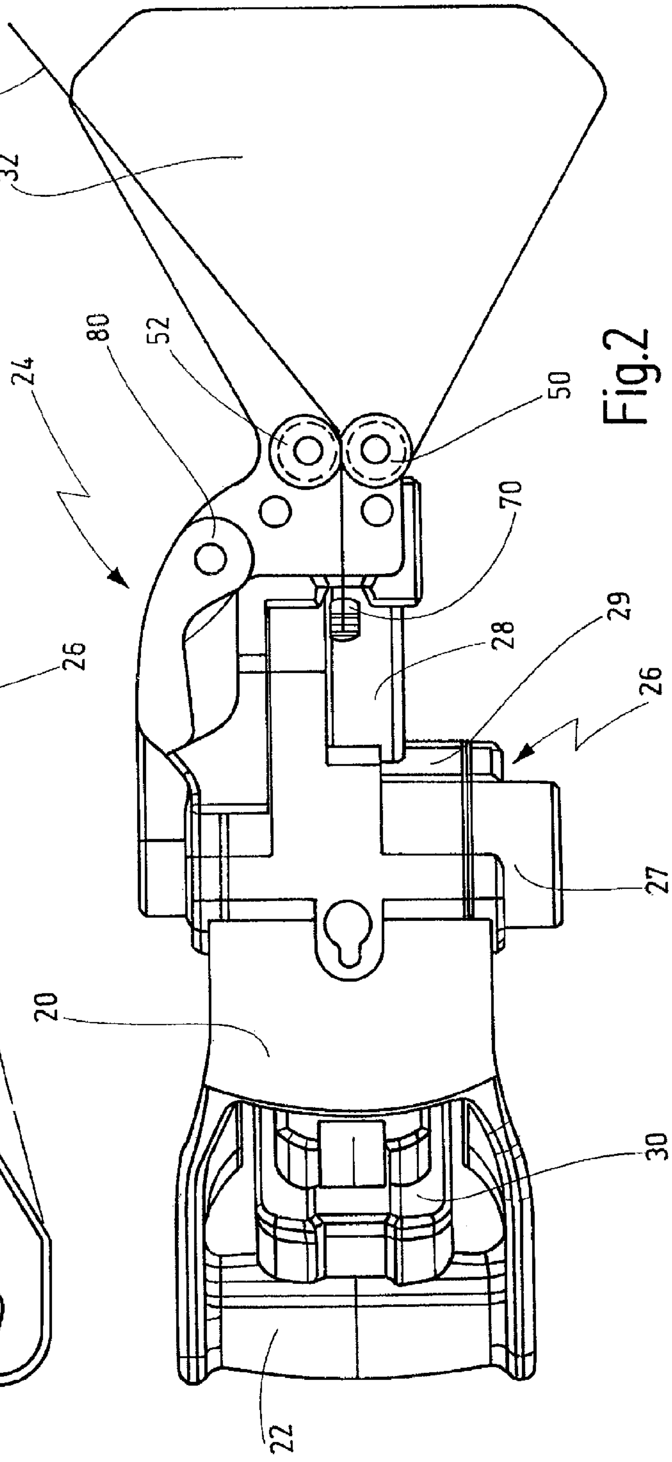
FIG. 2 shows an enlarged view of the winding-up device according to FIG. 1 where the details are visible in greater detail.

The support 32, with the guide rolls 50, 52 provided on it, is detachably mounted on the housing 20 of the winding-up device 24 by means of a clamping mechanism 80 (compare FIG. 2). The drive 26 comprises a d.c. motor 27 which is coupled with the coil 28 via a gearing 29 for driving the coil.

The motor 27 is supplied with current from an accumulator 30 mounted exchangeably on the housing 20. It is understood that instead of that arrangement a mains-operated configuration or else any other suitable operating method, for example a pneumatic system, may be used as well.

When the coil 28 is operated, the cutting means 18 is wound up on the coil 28 in working direction, through an opening 70 and via the guide rolls 50, 52.

It can be seen in FIG. 3 that the housing 20 of the winding-up device 24 tapers from the handle 22 approximately in wedge form, at an angle α of approximately 13°, toward the opposite end on which the support 32 is mounted. Depending on the particular design, the angle α preferably is in a range of between 10 to 30°.

That configuration makes the winding-up device 24 relatively narrow on its end that faces toward the body flange during use so that it can be supported on the frame or on the body flange 14 relatively easily even in the presence of obstacles, such as articles on instrument panels. It is understood that the support 32 used may be adapted in each case to the geometrical conditions of the respective vehicle type.

As a rule, the cutting-through operation effected by winding up the cutting means 18 on the coil 28 in working direction has to be interrupted several times because the winding-up device 24 must be moved past obstacles on the instrument panel and because its support 32 must then by applied again to the frame or body flange 14. Under certain conditions this may even require that the cutting means 18 be temporarily withdrawn from the coil 28.

Considering that as a rule the cutting means 18 can be unwound from the coil 28 only by application of considerable forces, due to the high gear reduction ratio, a strain relief device 36 is provided according to the invention. The strain relief device 36 may comprise a mechanical overrun clutch that may be directly coupled with the gear 29. This prevents the cutting means 18 from being withdrawn from the coil 28 in inoperative condition of the drive 26.

Preferably, the winding-up device 24 is however provided with an intelligent control 46 which in inoperative condition of the drive 26 detects that a force is being applied on the cutting means 28 to withdraw it from the coil 28. The winding-up device 24 assists the user in that case by driving the coil 28 in a sense opposite to the working direction so that the cutting means 18 is unwound from the coil 28. Preferably, the arrangement is such that the speed at which the cutting means 18 is unwound will rise as the pull exerted on the cutting means 18 increases. An unwinding process is ended as soon as a pulling force is no longer exerted on the winding-up device 24 or when a switch 44 is operated to activate the drive 26.

In this way, unwinding of the cutting means 18 is made very comfortable when the winding-up device 24 has to be moved to a different position and when the cutting means 18 has to be unwound for that purpose.

Figure 4:
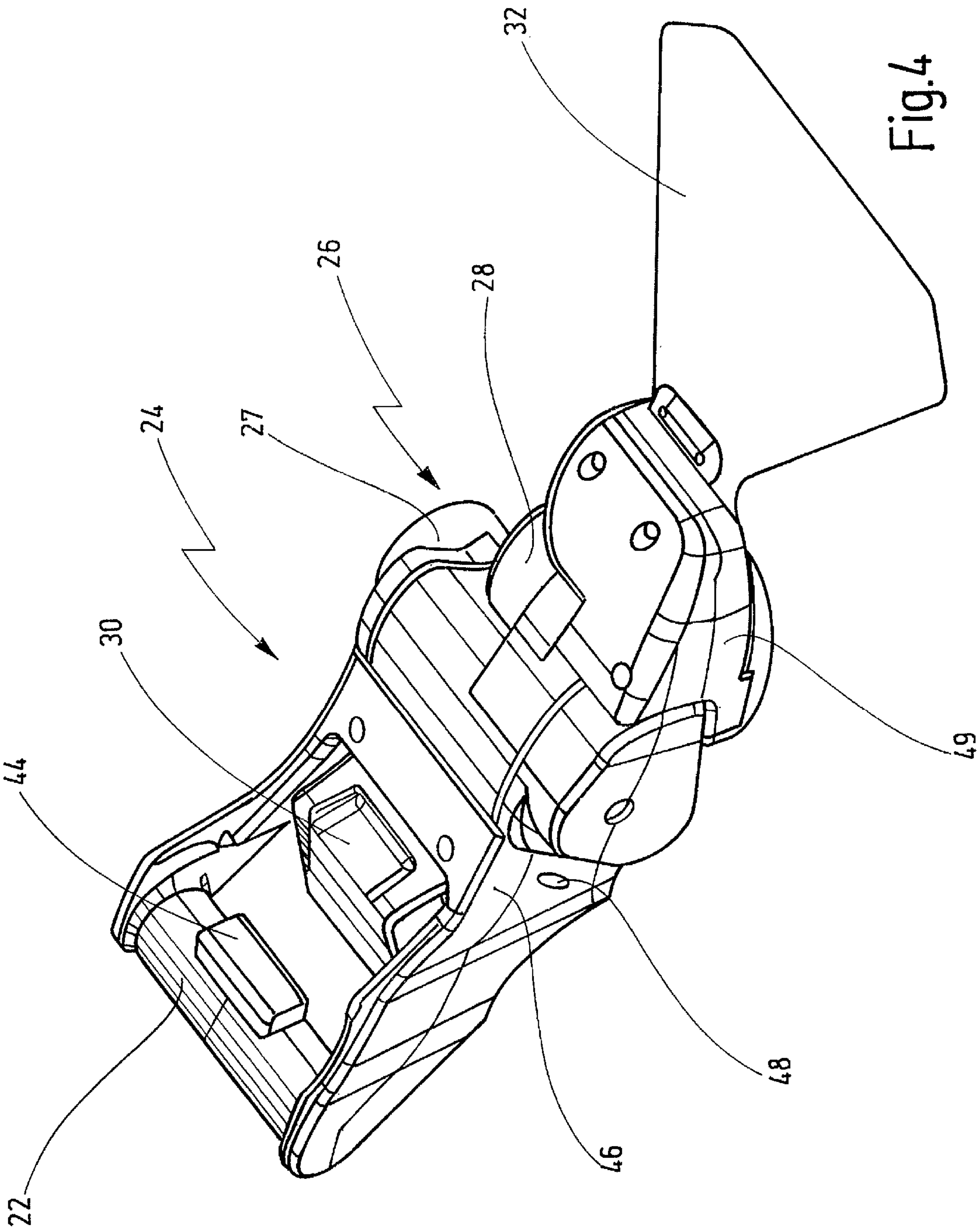
FIG. 4 shows an oblique view taken from above of the winding-up device according to FIG. 2.

The switch 44 is designed as an accelerator switch and is located directly on the handle 22, as is shown in FIG. 4. The accelerator switch 44 is operated via a push-button. The accelerator switch 44 allows the user to control the desired coil speed and, thus, the cutting speed.

Further, a mechanical clutch, indicated by 49 in FIG. 4, is integrated in the drive train. The clutch 49 protects the cutting means 18 from overloading and breakage. That overload protection 24 reacts as soon as the maximally admissible pull is reached on the cutting means 18. Activation of the overload protection 49 is signaled to the user by an optical and/or acoustic signaling means 48. When the strain relief device 36 is activated to permit the cutting means to be withdrawn from the coil 28 in a sense opposite to the working direction, this condition is likewise signaled by a corresponding signal for which purpose the signaling means 48 may be used as well. For example, different signal tones may be used for activation of the strain relief device 36 on the one hand and for activation of the overload protection 49 on the other hand. Alternatively, it is also possible to make use of a mechanical signal, for example in the form of a ratchet or a vibration.

What is claimed is:

1. A device for cutting through an adhesive bead of a vehicle pane, said device comprising winding-up device, wherein said winding-up device comprises:

a coil for winding up a cutting means in a working direction for cutting through said adhesive bead;

a motor drive coupled to said coil for rotating said coil;

a strain relief coupled to said motor drive so as to allow relief of said cutting means from said coil in a relief direction in a sense opposite to said working direction; and a control having a switch for switching said drive between an on-state and an off-state;

wherein said control is configured for rotating said drive in said working direction when said switch is in said on-state; and wherein said control is configured for rotating said drive in said relief direction for a preset time before stopping said drive upon switching into said off-state.

2. The device of claim 1, wherein said control is configured so that a speed of rotation in said relief direction will increase as said external pull force exerted upon said cutting means increases.

3. The device of claim 1, wherein said control is configured so that said rotation in said relief direction will end when no further external pull force is exerted upon said cutting means.

4. The device of claim 1, further comprising a signaling means that signals an activation of said strain relief.

5. The device of claim 1, further comprising an overload protection and a signaling means which signals an actuation of said overload protection.

6. The device of claim 1, wherein said working direction is selected from the group consisting of a clockwise and counter-clockwise rotation.

7. The device of claim 1, wherein said strain relief comprises a mechanical overrun clutch.

8. The device of claim 1, wherein said control is configured for reeling in said cutting means by rotating said drive in said working direction for a time being substantially equal to said preset time when no external pull force is exerted on said cutting means upon switching said drive into said off-state.

9. The device of claim 1, wherein said control controls said drive for rotating in said working direction when said switch is in said on-state; and wherein when an external pull force is exerted upon said cutting means, said control controls said drive for rotating in said relief direction upon switching into said off-state.

10. The device of claim 9, wherein said control is configured so that a speed of rotation in said relief direction will increase as said external pull force exerted upon said cutting means increases.

11. The device of claim 10, wherein said control is configured so that said rotation in said relief direction will end when no further external pull force is exerted upon said cutting means.

12. The device of claim 1 further comprising a signaling means that signals an activation of said strain relief.

13. The device of claim 1, further comprising an overload protection and a signaling means which signals an actuation of said overload protection.

14. The device of claim 13, wherein said overload protection comprises a clutch that can be activated mechanically.

15. The device of claim 1, wherein said winding-up device further comprises:

a handle arranged on a first end of said winding-up device; and a removable support disposed on a second end of said winding-up device opposite said handle for guiding said winding-up device along a frame to which said pane is bonded.

16. The device of claim 15, further comprising:

a control for controlling a winding-up speed of said coil; and an accelerator switch, operable by a push-button, which is coupled with said control for controlling said winding-up speed of said coil.

17. The device of claim 15, further comprising a housing that is substantially wedge-shaped widening from said support toward said handle.

* * * * *